United States Patent
Kamada

(10) Patent No.: US 9,548,831 B2
(45) Date of Patent: Jan. 17, 2017

(54) SYNCHRONIZING SYSTEM, SYNCHRONIZING METHOD, FIRST SYNCHRONIZING DEVICE, SECOND SYNCHRONIZING DEVICE, AND COMPUTER PROGRAM

(75) Inventor: Shinya Kamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 96 days.

(21) Appl. No.: 14/002,520

(22) PCT Filed: Mar. 2, 2012

(86) PCT No.: PCT/JP2012/055376
§ 371 (c)(1),
(2), (4) Date: Aug. 30, 2013

(87) PCT Pub. No.: WO2012/118178
PCT Pub. Date: Sep. 7, 2012

(65) Prior Publication Data
US 2013/0336341 A1 Dec. 19, 2013

(30) Foreign Application Priority Data
Mar. 3, 2011 (JP) ................................ 2011-046156

(51) Int. Cl.
*H04J 3/06* (2006.01)
*H04J 3/14* (2006.01)

(52) U.S. Cl.
CPC ............ *H04J 3/0638* (2013.01); *H04J 3/0667* (2013.01); *H04J 3/14* (2013.01)

(58) Field of Classification Search
CPC ........... H04J 3/0638; H04J 3/0667; H04J 3/14
See application file for complete search history.

(56) References Cited

U.S. PATENT DOCUMENTS

| 6,199,169 B1 | 3/2001 | Voth |
| 8,427,907 B2 | 4/2013 | Shibata |
| 2004/0109474 A1* | 6/2004 | Koshino ............... H04J 3/0658 370/503 |

FOREIGN PATENT DOCUMENTS

| CN | 1505279 A | 6/2004 |
| EP | 2 169 859 | 3/2010 |

(Continued)

OTHER PUBLICATIONS

JP Office Action dated Jan. 21, 2014, with partial English Translation; Application No. 2013-502414.
(Continued)

*Primary Examiner* — Jackie Zuniga Abad
(74) *Attorney, Agent, or Firm* — Young & Thompson

(57) ABSTRACT

Provided is a synchronization system comprising a first synchronization device and a second synchronization device which carry out synchronization processing by transmitting and receiving synchronization packets in accordance with a synchronization protocol and which synchronize the times thereof. The first synchronization device, which corresponds to a slave device, notifies an abnormality to the second synchronization device when an abnormality related to time synchronization processing is detected. The second synchronization device, which corresponds to a master device, increases the interval during which synchronization is performed as the length of time during which an abnormality notification is not received increases.

8 Claims, 10 Drawing Sheets

(56) References Cited

FOREIGN PATENT DOCUMENTS

| | | |
|---|---|---|
| JP | 2007-110759 | 4/2007 |
| JP | 2009-278424 | 11/2009 |
| JP | 2010-062992 | 3/2010 |

OTHER PUBLICATIONS

International Search Report, PCT/JP2012/055376, Jun. 12, 2012.
Extended European Search Report—PCT/JP2012/055376—Jul. 23, 2014.
David L. Mills, "Network Time Protocol (Version 3) Specification, Implementation and Analysis", rfc1305.txt, University of Delaware, Mar. 1992.
David L. Mills, "Internet Time Synchronization: The Network Time Protocol", IEEE Transactions on Communications, vol. 39, No. 10, pp. 1482-1493 (Oct. 1, 1991).
Chinese Office Action dated Jun. 2, 2015; Application No. 201280011117.9.

* cited by examiner

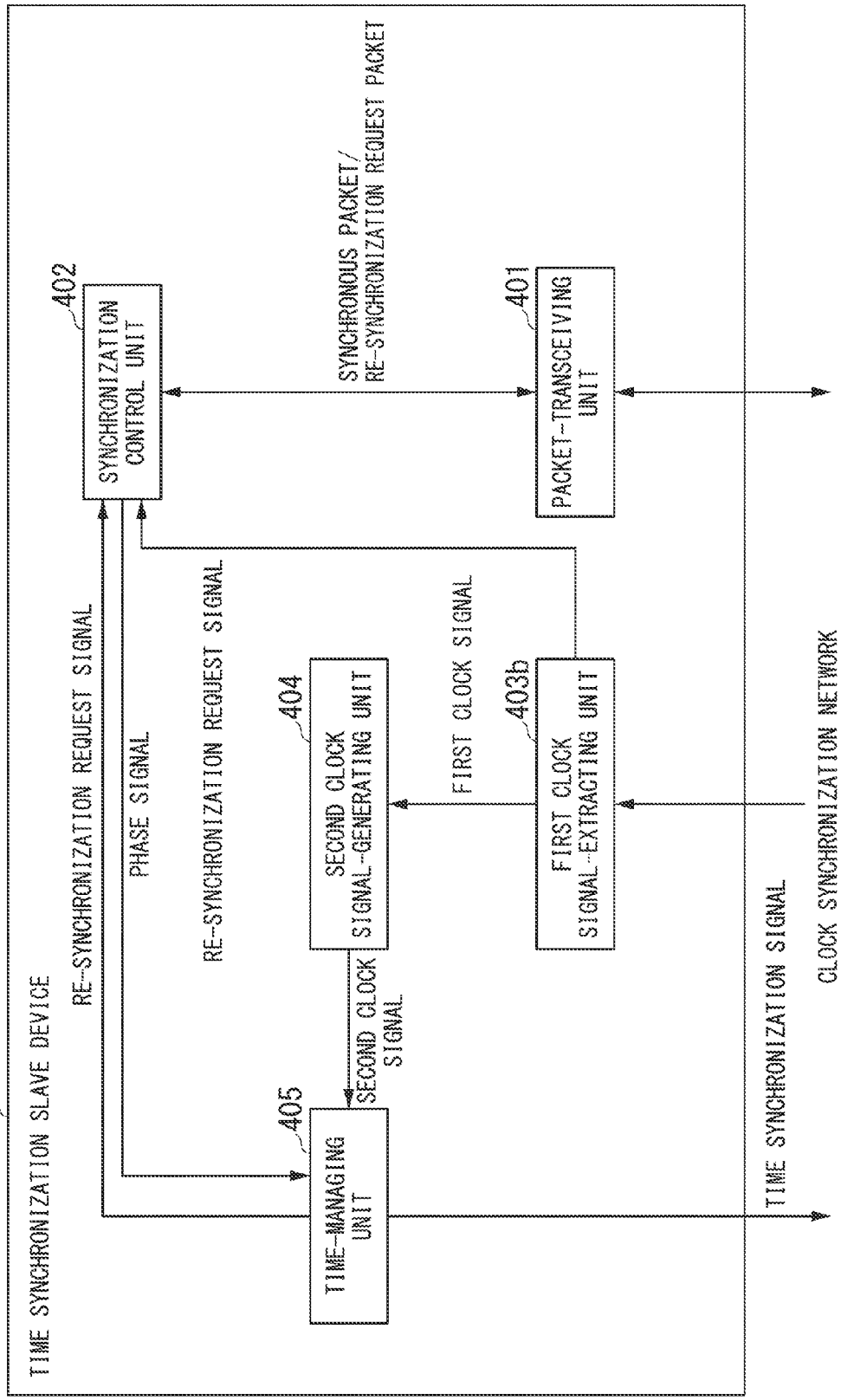

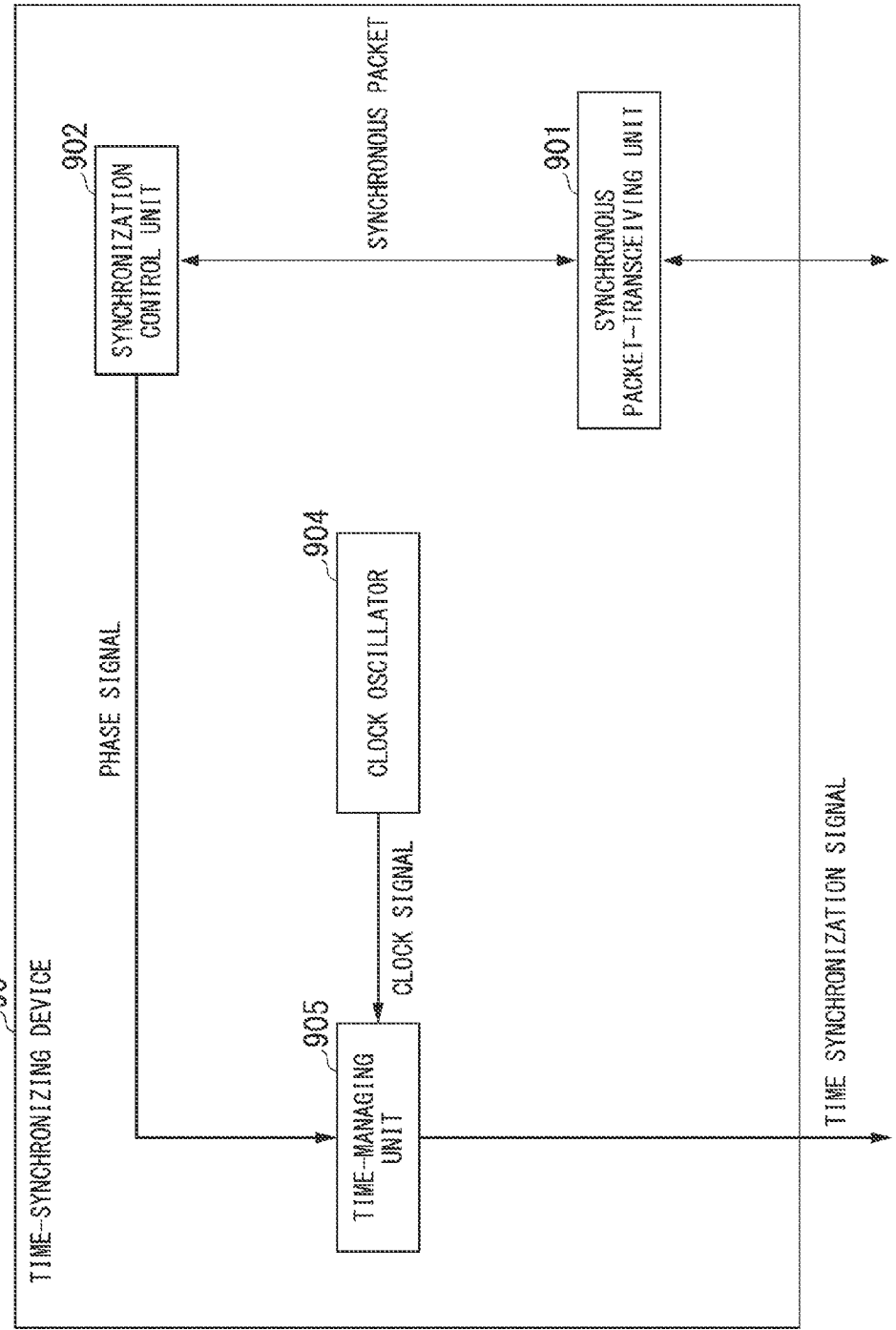
FIG. 10 "Related Art"

SYNCHRONIZING SYSTEM, SYNCHRONIZING METHOD, FIRST SYNCHRONIZING DEVICE, SECOND SYNCHRONIZING DEVICE, AND COMPUTER PROGRAM

TECHNICAL FIELD

The present invention relates to a technique for performing time synchronization between devices performing communication with each other.

BACKGROUND ART

In the past, techniques of performing time synchronization between communication devices which are physically separated from each other have been proposed (see Patent Document 1). As an example of such techniques, there is a technique using a synchronization-processing packet (a synchronous packet). FIG. 10 is a diagram illustrating a configuration example of a time-synchronizing device 90 related to the technique. The time-synchronizing device 90 includes a synchronous packet-transceiving unit 901, a synchronization control unit 902, a clock oscillator 904, and a time-managing unit 905. The time-synchronizing device 90 records a time counted by the time-managing unit 905 with a predetermined degree of accuracy through the clock oscillator 904 installed in its own device. However, even when the time-synchronizing device 90 performs time synchronization with a master device once, the synchronization accuracy degrades with the lapse of time, leading to a deviation. For this reason, typically, the time-synchronizing device 90 periodically performs transmission and reception of synchronous packets with the master device to perform a synchronization process.

DOCUMENTS OF THE PRIOR ART

Patent Documents

[Patent Document 1] Japanese Unexamined Patent Application, First Publication No. 2010-062992

DISCLOSURE OF INVENTION

Problem to be Solved by the Invention

Since a communication path band is a limited resource, it is desirable for the proportion of a synchronous packet among packets flowing through the communication path to be low. In other words, it is desirable for an interval at which the synchronous packet is transmitted and received to be long. However, when the interval is too long, the synchronization accuracy degrades, and time deviation between the communication devices is likely to increase.

In light of the foregoing, the present invention is directed to providing a technique capable of reducing the communication frequency of the synchronous packet while preventing a decrease in the accuracy of the time synchronization of the communication device.

Means for Solving the Problem

An aspect of the present invention provides a synchronizing system including a first synchronizing device and a second synchronizing device that transmit or receive a synchronous packet according to a synchronous protocol, perform a synchronization process, and synchronize a time with each other. The first synchronizing device includes a transceiving unit that transmits or receives the synchronous packet to or from the second synchronizing device, a synchronization control unit that acquires a difference between a time of an own device and a time of the second synchronizing device based on the synchronous packet, a time-managing unit that corrects the time of the own device based on the difference, and an abnormality notification unit that notifies the second synchronizing device of an abnormality when the abnormality related to a process of synchronizing a time is detected. The second synchronizing device includes a transceiving unit that transmits or receives the synchronous packet to or from the first synchronizing device, a synchronization interval control unit that increases an interval at which the synchronization process is performed as the length of time during which the abnormality is not notified of increases, and a synchronization control unit that performs the synchronization process at the interval determined by the synchronization interval control unit.

An aspect of the present invention provides a synchronizing method performed by a synchronizing system including a first synchronizing device and a second synchronizing device that transmit or receive a synchronous packet according to a synchronous protocol, perform a synchronization process, and synchronize a time with each other, the method including a transceiving step of transmitting or receiving, by the first synchronizing device, the synchronous packet to or from the second synchronizing device, a synchronization control step of acquiring, by the first synchronizing device, a difference between a time of an own device and a time of the second synchronizing device based on the synchronous packet, a time-managing step of correcting, by the first synchronizing device, the time of the own device based on the difference, an abnormality notification step of notifying, by the first synchronizing device, the second synchronizing device of an abnormality when the abnormality related to a process of synchronizing a time is detected, a transceiving step of transmitting or receiving, by the second synchronizing device, the synchronous packet to or from the first synchronizing device, a synchronization interval control step of increasing, by the second synchronizing device, an interval at which the synchronization process is performed as the length of time during which the abnormality is not notified of increases, and a synchronization control step of performing, by the second synchronizing device, the synchronization process at the interval determined by the synchronization interval control step.

An aspect of the present invention provides a first synchronizing device of a synchronizing system including the first synchronizing device and a second synchronizing device that transmit or receive a synchronous packet according to a synchronous protocol, perform a synchronization process, and synchronize a time with each other, the first synchronizing device including a transceiving unit that transmits or receives the synchronous packet to or from the second synchronizing device that increases an interval at which the synchronization process is performed as the length of time during which abnormality is not notified of increases, a synchronization control unit that acquires a difference between a time of an own device and a time of the second synchronizing device based on the synchronous packet, a time-managing unit that corrects the time of the own device based on the difference, and an abnormality notification unit that notifies the second synchronizing device of an abnormality when the abnormality related to a process of synchronizing a time is detected.

An aspect of the present invention provides a second synchronizing device of a synchronizing system including a first synchronizing device and the second synchronizing device that transmit or receive a synchronous packet according to a synchronous protocol, perform a synchronization process, and synchronize a time with each other, the second synchronizing device including a transceiving unit that transmits or receives the synchronous packet to or from the first synchronizing device that notifies of an abnormality when the abnormality related to a process of synchronizing a time is detected, a synchronization interval control unit that increases an interval at which the synchronization process is performed as the length of time during which the abnormality is not notified of from the first synchronizing device increases, and a synchronization control unit that performs the synchronization process at the interval determined by the synchronization interval control unit.

An aspect of the present invention provides a computer program causing a computer to function as a first synchronizing device of a synchronizing system including the first synchronizing device and a second synchronizing device that transmit or receive a synchronous packet according to a synchronous protocol, perform a synchronization process, and synchronize a time with each other, and the computer program causes the computer to execute a transceiving step of transmitting or receiving the synchronous packet to or from the second synchronizing device that increases an interval at which the synchronization process is performed as the length of time during which abnormality is not notified of increases, a synchronization control step of acquiring a difference between a time of an own device and a time of the second synchronizing device based on the synchronous packet, a time-managing step of correcting the time of the own device based on the difference, and an abnormality notification step of notifying the second synchronizing device of an abnormality when the abnormality related to a process of synchronizing a time is detected.

An aspect of the present invention provides a computer program causing a computer to function as a second synchronizing device of a synchronizing system including a first synchronizing device and the second synchronizing device that transmit or receive a synchronous packet according to a synchronous protocol, perform a synchronization process, and synchronize a time with each other, and the computer program causes the computer to execute a transceiving step of transmitting or receiving the synchronous packet to or from the first synchronizing device that notifies of an abnormality when the abnormality related to a process of synchronizing a time is detected, a synchronization interval control step of increasing an interval at which the synchronization process is performed as the length of time during which the abnormality is not notified of from the first synchronizing device increases, and a synchronization control step of performing the synchronization process at the interval determined by the synchronization interval control step.

Effect of the Invention

According to the present invention, it is possible to reduce the communication frequency of a synchronous packet while preventing a decrease in the accuracy of the time synchronization between the communication devices.

BRIEF DESCRIPTION OF THE DRAWINGS

FIG. 9 is a functional block diagram representing a configuration of a time synchronization slave device according to the second embodiment.

FIG. 10 is a diagram illustrating a configuration example of a related time-synchronizing device.

EMBODIMENTS FOR CARRYING OUT THE INVENTION

[First Embodiment]

Figure 1:
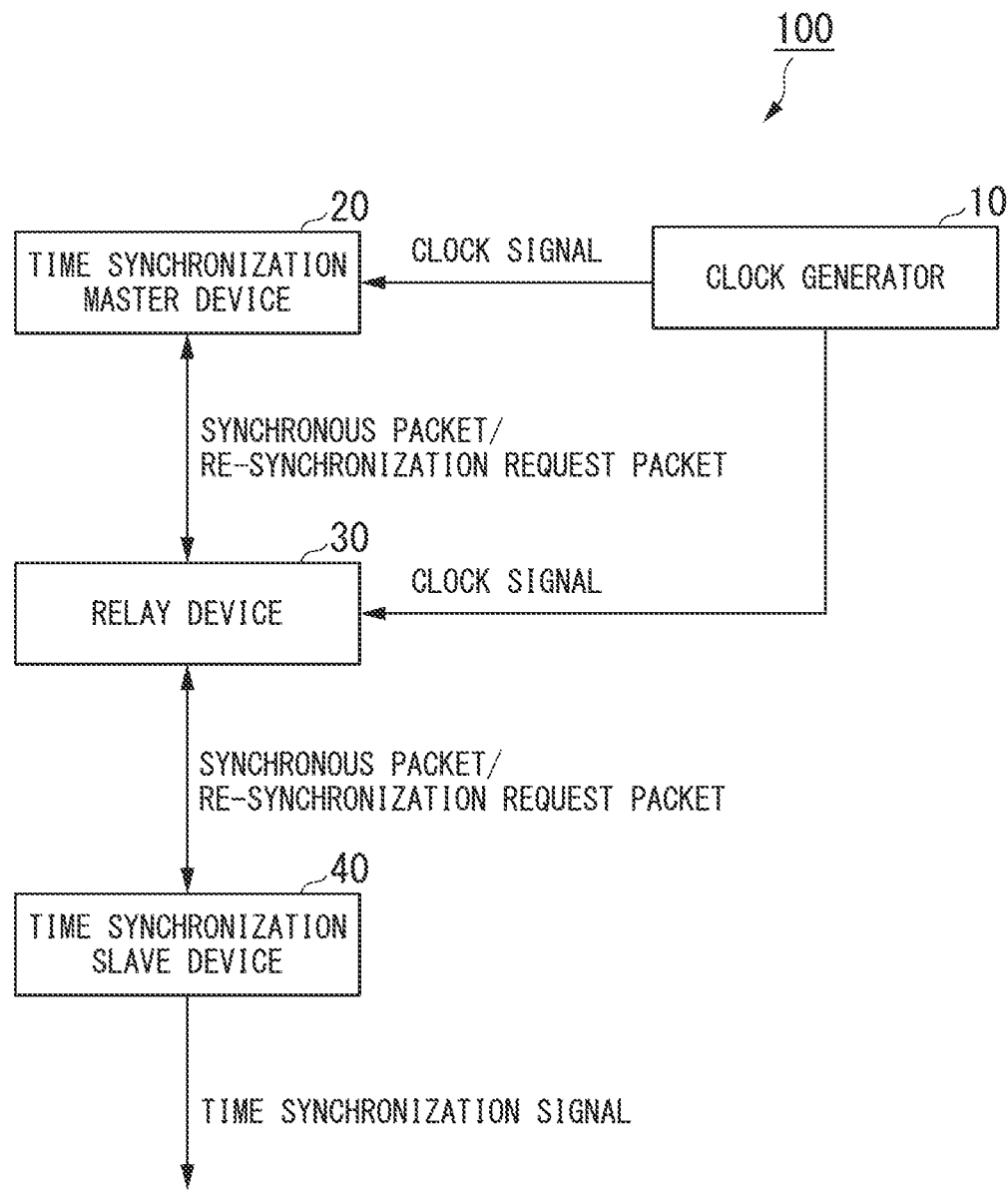
FIG. 1 is a system configuration diagram illustrating a system configuration of a synchronizing system according to a first embodiment.

FIG. 1 is a system configuration diagram illustrating a system configuration of a synchronizing system (a synchronizing system 100 which corresponds to a "synchronizing system" of the present invention) according to a first embodiment. The synchronizing system 100 includes a clock generator 10, a time synchronization master device 20 (which corresponds to a "second synchronizing device" of the present invention), a relay device 30, and a time synchronization slave device 40 (which corresponds to a "first synchronizing device" of the present invention). In FIG. 1, the synchronizing system 100 includes one of each device, but the number of each device disposed in the synchronizing system 100 is not limited to one. Further, the number of the relay device 30 disposed between the time synchronization master device 20 and the time synchronization slave device 40 is not limited to one and may be two or more.

First of all, an outline of the synchronizing system 100 will be described. The time synchronization master device 20 and the time synchronization slave device 40 perform transmission and reception of synchronous packets with each other according to a predetermined protocol. Through the transmission and reception of the synchronous packets, time synchronization is performed between the time synchronization master device 20 and the time synchronization slave device 40. Any protocol through which time synchronization can be performed may be used as the predetermined protocol. Concrete examples of the predetermined protocol include IEEE1588 and IEEE1588 version2.

The time synchronization master device 20 transmits the synchronous packet to the time synchronization slave device 40 to perform the time synchronization process. When the time synchronization process is performed, the time synchronization master device 20 is on standby for the time synchronization process without transmitting the synchronous packet until a next timing comes. The time synchronization slave device 40 counts a time based on a clock signal until next time synchronization is performed after time synchronization is performed. Then, the time synchronization slave device 40 outputs a time synchronization signal at predetermined time intervals. The clock signal used for counting of time by the time synchronization slave device 40 is a clock signal flowing through a communication path between the relay device 30 and the time synchronization slave device 40. Thus, the time synchronization slave device 40 need not include a clock signal-generating device (for example, a clock oscillator) that outputs a clock signal used to generate the time synchronization signal, and can maintain a time with a high degree of accuracy.

Upon detecting an abnormality related to synchronization of time, the time synchronization slave device 40 transmits a re-synchronization request packet to the time synchronization master device 20. The time synchronization master device 20 increases an interval (hereinafter referred to as "synchronization interval") at which the time synchronization process according to the length of time during which the re-synchronization request packet is not received from the time synchronization slave device 40 or the number of times that the time synchronization process is performed without receiving the re-synchronization request packet. For this reason, unless an abnormality related to synchronization of time is detected, the synchronization interval increases, and thus the communication frequency of the synchronous packet decreases. Meanwhile, when the re-synchronization request packet is received from the time synchronization slave device 40, the time synchronization master device 20 reduces the increased synchronization interval. After the re-synchronization request packet is transmitted, since the synchronization interval is reduced, time deviation is immediately corrected by the synchronization process, and thus a decrease in the accuracy of the time synchronization in the synchronization slave device 40 is suppressed.

Next, among the above-mentioned time synchronization protocols, IEEE1588 will be described as a concrete example.

Figure 2:
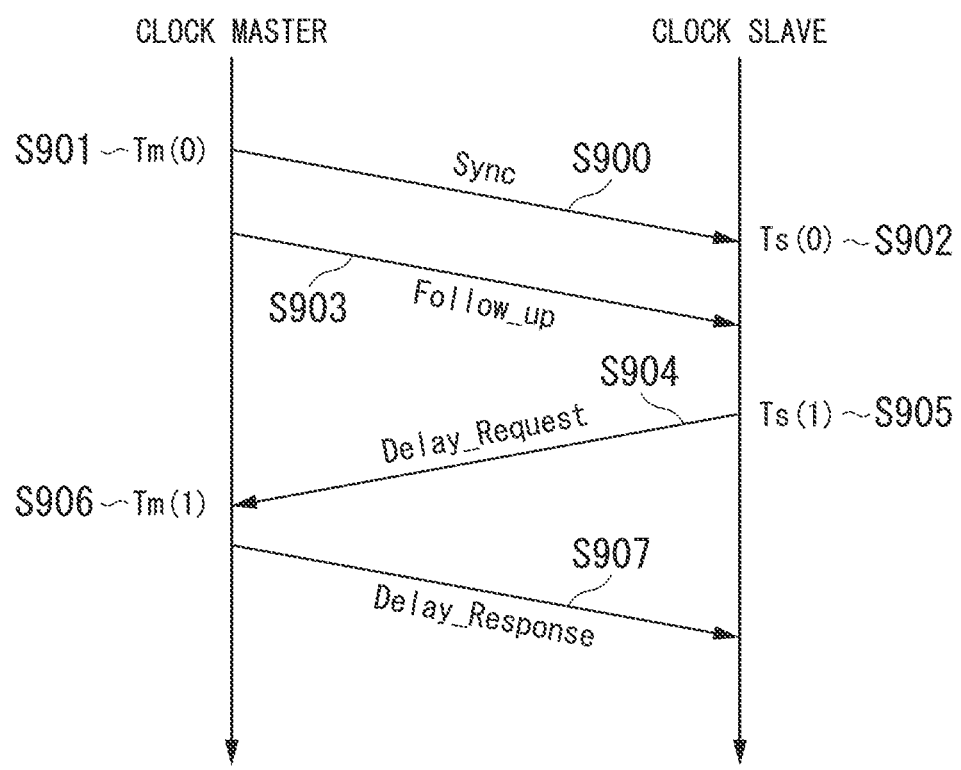
FIG. 2 is a sequence diagram illustrating a communication sequence according to a time synchronization algorithm of IEEE1588.

FIG. 2 is a sequence diagram illustrating a communication sequence according to a time synchronization algorithm of IEEE1588. Referring to FIG. 2, two-way communication is performed between a clock master (corresponding to a time synchronization master device) and a clock slave (corresponding to a time synchronization slave device), and the clock slave periodically synchronizes a time with the clock master. In FIG. 2, messages (a Sync message, a Follow_up message, a Delay_Request message, and a Delay_Response message) transmitted from the clock master or the clock slave correspond to a synchronous packet.

The clock master periodically transmits the Sync message to the clock slave (step S900). The clock master records a transmission time (hereinafter referred to as a "Sync transmission time") Tm(0) of the Sync message (step S901). Next, the clock master transmits the Follow_up message to the clock slave (step S903). At this time, the clock master includes the Sync transmission time Tm(0) in the Follow_up message.

Upon receiving the Sync message, the clock slave records a reception time (hereinafter referred to as a "Sync reception time") Ts(0) of the Sync message using the reception process as a trigger (step S902). Next, the clock slave receives the Follow_up message, and extracts and records the Sync transmission time Tm(0) included in the Follow_up message. Next, the clock slave transmits the Delay_Request message to the clock master (step S904). Then, the clock slave records a transmission time (hereinafter referred to as a "Delay transmission time") Ts(1) of the Delay_Request message (step S905).

Upon receiving the Delay_Request message, the clock master records a reception time (hereinafter referred to as a "Delay reception time") Tm(1) of the Delay_Request message using the reception process as a trigger (step S906). Next, the clock master transmits the Delay_Response message to the clock slave (step S907). At this time, the clock master includes the Delay reception time Tm(1) in the Delay_Response message.

Upon receiving the Delay_Response message, the clock slave extracts the Delay reception time Tm(1) included in the Delay_Response message, and records the Delay reception time Tm(1).

The clock slave calculates a difference MS_Diff between a time (hereinafter referred to as a "master time") in the clock master and a time (hereinafter referred to as a "slave time") in the clock slave based on the Sync transmission time Tm(0) and the Sync reception time Ts(0) using the following Equation 1:

$$MS\_Diff = Ts(0) - Tm(0) = MS\_Delay + \text{Offset} \quad \text{Equation 1}$$

Further, the clock slave calculates the difference between the slave time and the master time based on the Delay transmission time Ts(1) and the Delay reception time Tm(1) using the following Equation 2:

$$SM\_Diff = Tm(1) - Ts(1) = SM\_Delay - \text{Offset} \quad \text{Equation 2}$$

Here, MS_Delay represents a transmission delay from the clock master to the clock slave, SM_Delay represents a transmission delay from the clock slave to the clock master, and Offset represents a time offset (leading) of the clock slave on the clock master. The transmission delays MS_Delay and SM_Delay include a propagation delay between the clock master and the clock slave and a queuing delay occurring in a relay node on a network between the clock master and the clock slave.

As described above, two Equations, that is, Equations 1 and 2, are obtained in connection with an Offset which is time deviation of the clock slave with respect to the clock master. However, the two Equations include unknown parameters such as MS_Delay and SM_Delay in addition to Offset. Thus, since only two Equations are present for three unknown parameters, it is difficult to calculate Offset. For this reason, in IEEE1588, under the assumption that the transmission delay MS_Delay from the clock master to the clock slave is equal to the transmission delay SM_Delay from the clock slave to the clock master, and the two values are all Delay, Equations 1 and 2 are converted into the following Equations 3 and 4:

$$MS\_Diff = \text{Delay} + \text{Offset} \quad \text{Equation 3}$$

$$SM\_Diff = \text{Delay} - \text{Offset} \quad \text{Equation 4}$$

The following Equation 5 is derived by solving simultaneous equations of Equations 3 and 4:

$$\text{Offset} = (MS\_Diff - SM\_Diff)/2 \quad \text{Equation 5}$$

The clock slave synchronizes the slave time with the master time by calculating the Offset using Equation 5 and correcting the slave time based on the Offset. The time synchronization algorithm specified in IEEE1588 has been described above.

Next, the details of the synchronizing system 100 will be described. The clock generator 10 supplies the clock signal to the time synchronization master device 20 and the relay device 30. Preferably, a high-accuracy clock generator generating a clock signal with a high degree of accuracy is used as the clock generator 10. For example, the clock generator 10 may be a Global Positioning System (GPS) receiver or may be configured using a high-performance oscillator.

The time synchronization master device 20 operates in synchronization with the clock signal output from the clock generator 10. The time synchronization master device 20 operates according to a predetermined protocol, and transmits or receives a synchronous packet to perform time synchronization with the time synchronization slave device 40. Through the time synchronization process, a time (hereinafter referred to as a "master device time") in the time synchronization master device 20 is synchronized with a time (hereinafter referred to as a "slave device time") in the time synchronization slave device 40.

The relay device 30 is a clock synchronization type communication device, and performs a packet relay process in synchronization with the clock signal output from the clock generator 10. For example, the relay device 30 relays a packet according to a synchronous communication scheme such as a synchronous digital hierarchy (SDH) or synchronous Ethernet (a registered trademark). More specifically, the relay device 30 synchronizes a clock of its own device with the clock signal received from the communication path, and transmits a signal to the communication path at the same frequency. In the communication path between the relay device 30 and the time synchronization slave device 40, clock synchronization is made according to the clock signal output by the clock generator 10, and the clock signal with a predetermined cycle is propagated. For example, in the case of the 100BASE-TX Ethernet (a registered trademark) interface, the clock signal flows through the communication path at 125 MHz.

The relay device 30 relays the synchronous packet received from the time synchronization master device 20 to the time synchronization slave device 40. The relay device 30 relays the synchronous packet received from the time synchronization slave device 40 to the time synchronization master device 20. Further, the relay device 30 relays the re-synchronization request packet received from the time synchronization slave device 40 to the time synchronization master device 20.

The time synchronization slave device 40 transmits or receives the synchronous packet to or from the time synchronization master device 20 via the relay device 30, and performs the time synchronization with the time synchronization master device 20. Further, the time synchronization slave device 40 acquires the synchronized clock signal from the communication path with the relay device 30. The time synchronization slave device 40 outputs the time synchronization signal synchronized with the time synchronization master device 20 based on the clock signal acquired from the communication path as a result of time synchronization. The destination to which the time synchronization slave device 40 outputs the time synchronization signal may be a network connected with the time synchronization slave device 40 or may be a device connected with the time synchronization slave device 40. The time synchronization slave device 40 may be integrated as a part of a device. In this case, the time synchronization slave device 40 outputs the time synchronization signal to another part of the device in which its own device is integrated.

Upon detecting an abnormality related to synchronization of time, the time synchronization slave device 40 transmits the re-synchronization request packet to the time synchronization master device 20.

Figure 3:
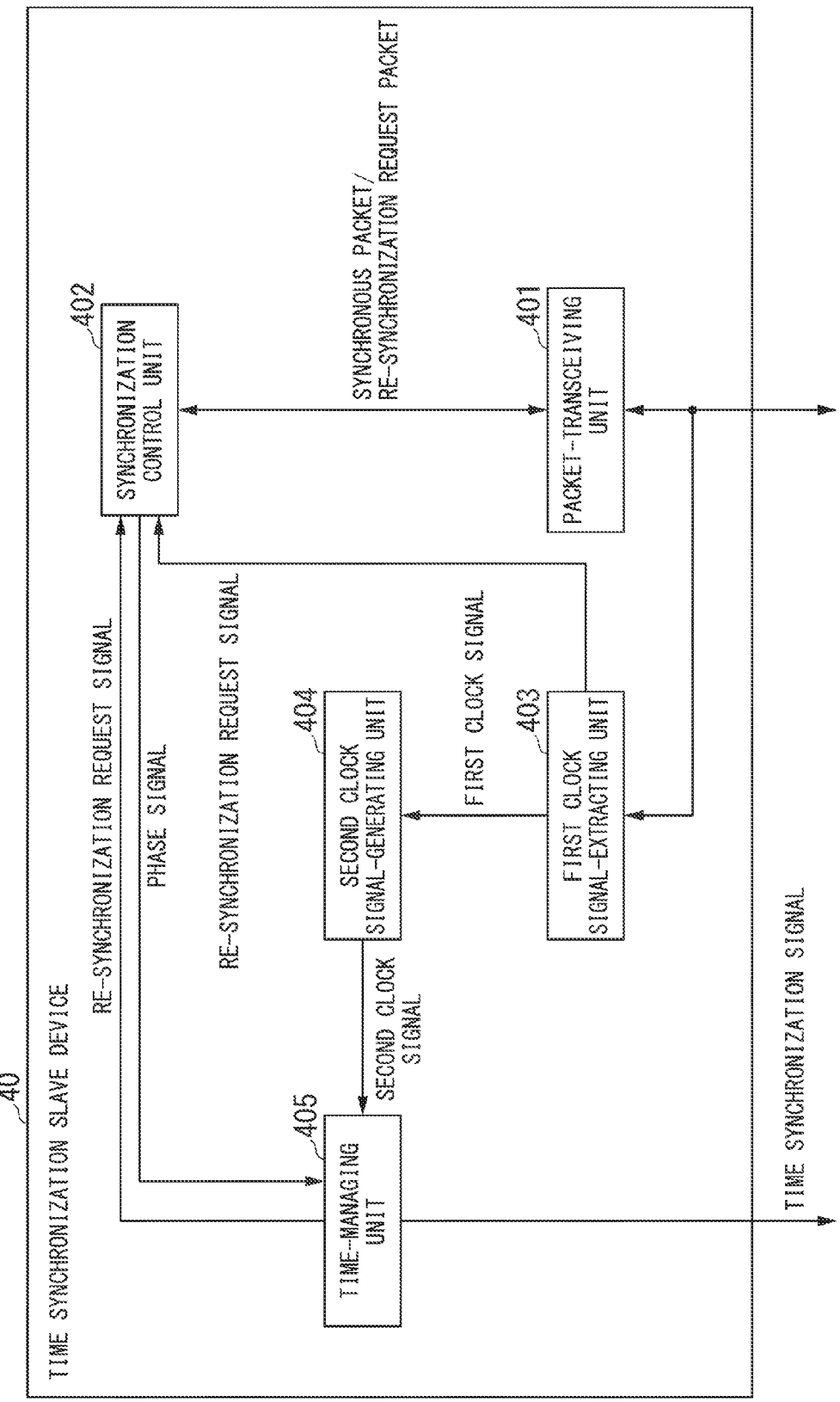
FIG. 3 is a functional block diagram illustrating a configuration of a time synchronization slave device.

FIG. 3 is a functional block diagram illustrating a configuration of the time synchronization slave device 40. The time synchronization slave device 40 includes a central processing unit (CPU), a memory, an auxiliary storage device, and the like which are connected with one another via a bus, and executes a time synchronization slave program. As the time synchronization slave program is executed, the time synchronization slave device 40 functions as a device including a packet-transceiving unit 401, a synchronization control unit 402, a first clock signal-extracting unit 403, a second clock signal-generating unit 404, and a time-managing unit 405. The functions of the time synchronization slave device 40 in whole or in part may be implemented using hardware such as an application specific integrated circuit (ASIC), a programmable logic device (PLD), or a field programmable gate array (FPGA). The time synchronization slave program may be recorded in a computer-readable recording medium. Examples of the computer-readable recording medium include a portable medium such as a flexible disk (FD), a magnetic optical disc, a ROM, or a CD-ROM, and a storage device such as a hard disk equipped in a computer system.

As the synchronization control unit 402, the first clock signal-extracting unit 403, and the time-managing unit 405 operate, processing corresponding to an "abnormality notification unit" of the present invention is executed.

The packet-transceiving unit 401 receives the synchronous packet from the communication path with the relay device 30, and transfers the synchronous packet to the synchronization control unit 402. Further, the packet-transceiving unit 401 transmits the synchronous packet or the re-synchronization request packet received from the synchronization control unit 402 to the communication path. The synchronous packet or the re-synchronization request packet transmitted to the communication path by the packet-transceiving unit 401 is relayed by the relay device 30 and then received by the time synchronization master device 20.

The synchronization control unit 402 exchanges the synchronous packet with the time synchronization master device 20 positioned at the end of the communication path, and synchronizes the slave device time with the master device time. The synchronization control unit 402 outputs a phase signal representing the difference between the slave device time and the master device time before synchronization to the time-managing unit 405 as a result of time synchronization.

Upon receiving a re-synchronization request signal from the first clock signal-extracting unit 403 or the time-managing unit 405, the synchronization control unit 402 transmits the re-synchronization request packet to the time synchronization master device 20. The re-synchronization request packet represents the fact that an abnormality related to synchronization of time is detected in the time synchronization slave device 40.

The first clock signal-extracting unit 403 extracts a clock signal from a signal of a physical layer received from the communication path. The first clock signal-extracting unit 403 outputs the extracted clock signal to the second clock signal-generating unit 404 as a first clock signal. When an abnormality related to synchronization of time is detected, the first clock signal-extracting unit 403 outputs the re-synchronization request signal to the synchronization control unit 402. Examples of such an abnormality related to synchronization of time include a status in which a failure has occurred in the communication path and a status in which the extracted clock signal has deteriorated.

The second clock signal-generating unit 404 generates a second clock signal synchronized with the first clock signal output from the first clock signal-extracting unit 403. The second clock signal-generating unit 404 generates the second clock signal by multiplying or dividing the first clock signal. The second clock signal is a clock signal used for the time-managing unit 405 to count the slave device time.

The time-managing unit 405 manages the slave device time. Specifically, the time-managing unit 405 counts the slave device time based on the second clock signal received from the second clock signal-generating unit 404. The time-managing unit 405 generates and outputs the time synchronization signal at predetermined time intervals. Upon receiving the phase signal from the synchronization control unit 402, the time-managing unit 405 corrects the slave device time based on the received phase signal. As the slave device time is corrected, an output timing of the time synchronization signal is corrected. The time-managing unit 405 counts the slave device time based on the second clock signal received from the second clock signal-generating unit 404 until the next phase signal is received after the slave device time is corrected based on the phase signal. For this reason, when the second clock signal is deviated, the counted slave device time is deviated, and a timing at which the time synchronization signal is output is deviated. This deviation is corrected based on the next phase signal.

Upon receiving the phase signal, the time-managing unit 405 determines whether or not an abnormality related to synchronization has occurred based on whether or not the time difference between the slave device time and the master device time is larger than a threshold value (hereinafter referred to as a "phase difference threshold value") which is set in advance. When the time difference between the slave device time and the master device time is less than the phase difference threshold value, the time-managing unit 405 corrects a time without outputting the re-synchronization request signal. However, when the time difference between the slave device time and the master device time is the phase difference threshold value or more, the time-managing unit 405 outputs the re-synchronization request signal and corrects a time.

Figure 4:
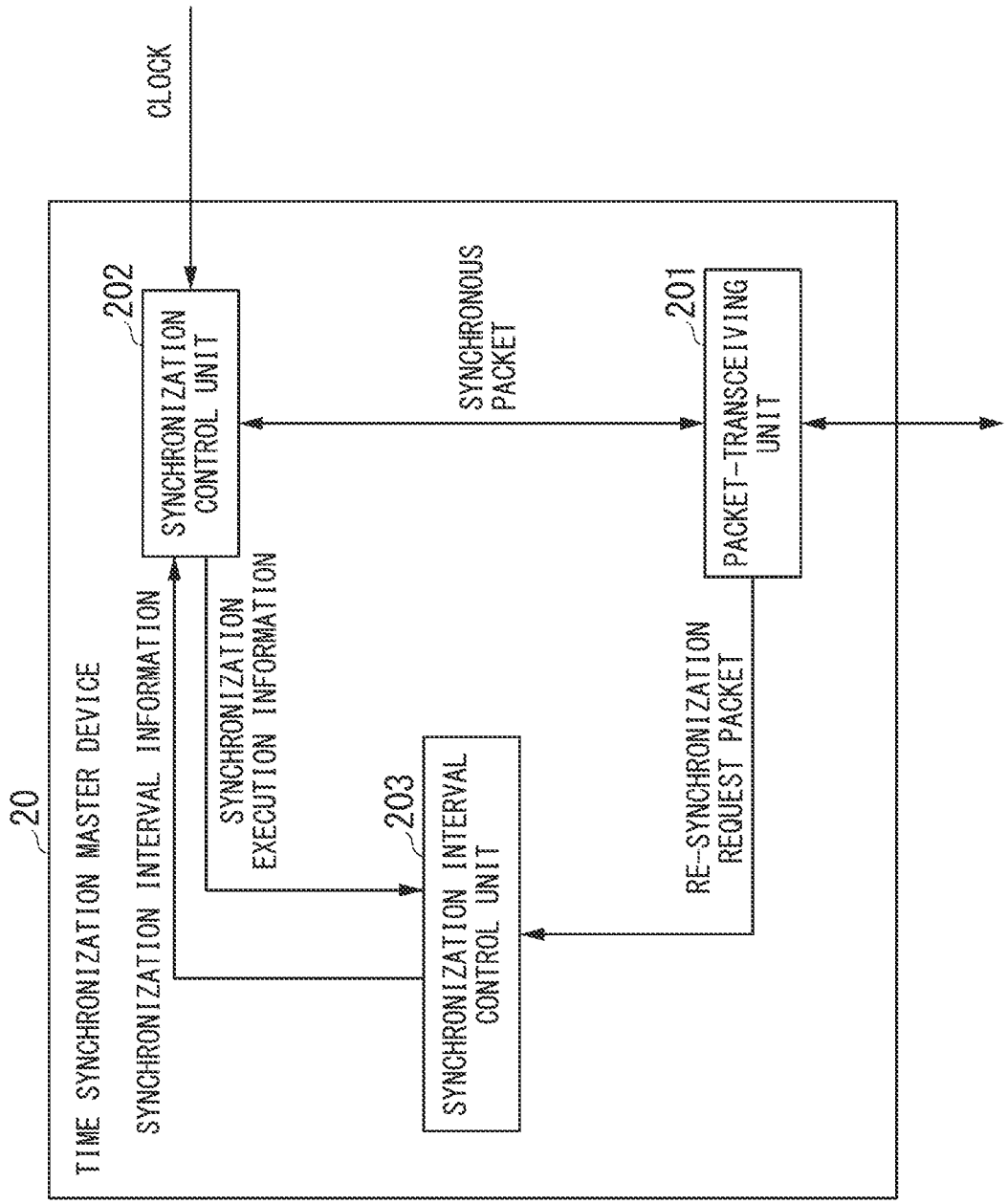
FIG. 4 is a functional block diagram illustrating a configuration of a time synchronization master device.

FIG. 4 is a functional block diagram illustrating a configuration of the time synchronization master device 20. The time synchronization master device 20 includes a CPU, a memory, an auxiliary storage device, and the like which are connected with one another via a bus, and executes a time synchronization master program. As the time synchronization master program is executed, the time synchronization master device 20 functions as a device including a packet-transceiving unit 201, a synchronization control unit 202, and a synchronization interval control unit 203. The functions of the time synchronization master device 20 in whole or in part may be implemented using hardware such as an ASIC, a PLD, or an FPGA. The time synchronization master program may be recorded in a computer-readable recording medium.

The packet-transceiving unit 201 receives the re-synchronization request packet from the communication path with the relay device 30, and transfers the re-synchronization request packet to the synchronization interval control unit 203. The packet-transceiving unit 201 receives the synchronous packet from the communication path with the relay device 30, and transfers the synchronous packet to the synchronization control unit 202. Further, the packet-transceiving unit 201 outputs the synchronous packet received from the synchronization control unit 202 to the communication path. The synchronous packet transmitted to the communication path by the packet-transceiving unit 201 is relayed by the relay device 30 and then received by the time synchronization slave device 40.

The synchronization control unit 202 exchanges the synchronous packet with the time synchronization slave device 40 positioned at the end of the communication path at a timing according to the synchronization interval determined by the synchronization interval control unit 203. The synchronization control unit 202 outputs synchronization execution information to the synchronization interval control unit 203 each time transmission and reception of a series of synchronous packets necessary for the time synchronization process are completed. The synchronization execution information represents that the synchronization process has been performed.

The synchronization interval control unit 203 determines the length of the synchronization interval. The synchronization interval control unit 203 determines the length of the synchronization interval such that the length of the synchronization interval increases as the length of time during which the re-synchronization request packet is not received increases. Upon receiving the re-synchronization request packet, the synchronization interval control unit 203 reduces the synchronization interval after that point in time to be shorter than the synchronization interval at that point in time.

A concrete example of the synchronization interval control unit 203 will be described below. The synchronization interval control unit 203 stores a table (hereinafter referred to as a "synchronization interval table") in which the interval control value is associated with the length of the synchronization interval, and determines the synchronization interval based on content of the synchronization interval table and the interval control value at that point in time. In the synchronization interval table, the larger the value of the interval control value, the larger the length of the corresponding synchronization interval. The interval control value increases as a time during which the re-synchronization request packet is not received increases. Upon receiving the re-synchronization request packet, the synchronization interval control unit 203 sets the interval control value to zero, which is an initial value. Further, the synchronization interval control unit 203 increases the interval control value by one (1) each time the synchronization execution information output from the synchronization control unit 202 is received. Thus, the number of times of the time synchronization process (hereinafter referred to as a "continuous synchronization frequency") performed without receiving the re-synchronization request packet is used as the interval control value.

Figure 5A:
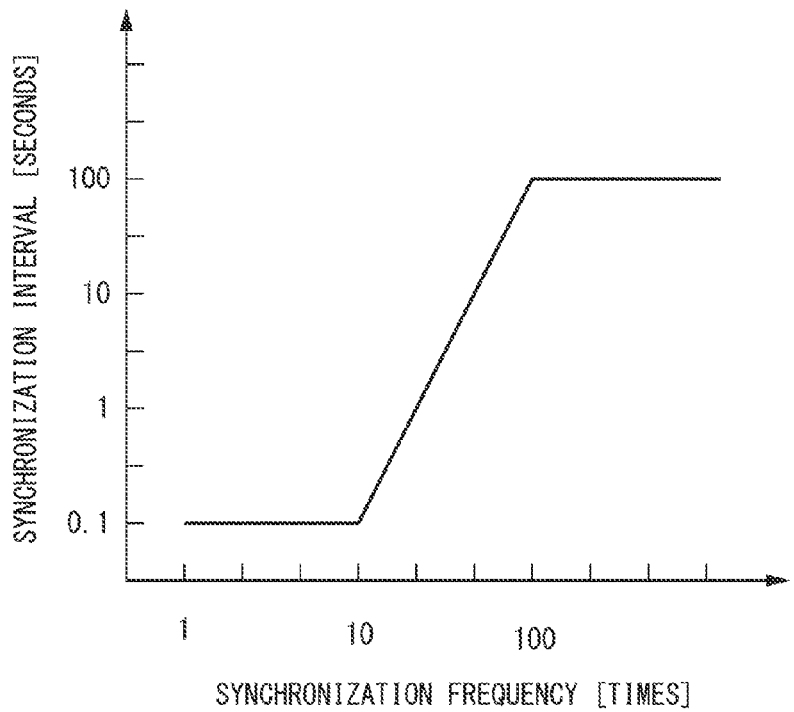
FIG. 5A is a graph illustrating a concrete example of a process of deciding the length of a synchronization interval through a synchronization interval control unit.
Figure 5B:
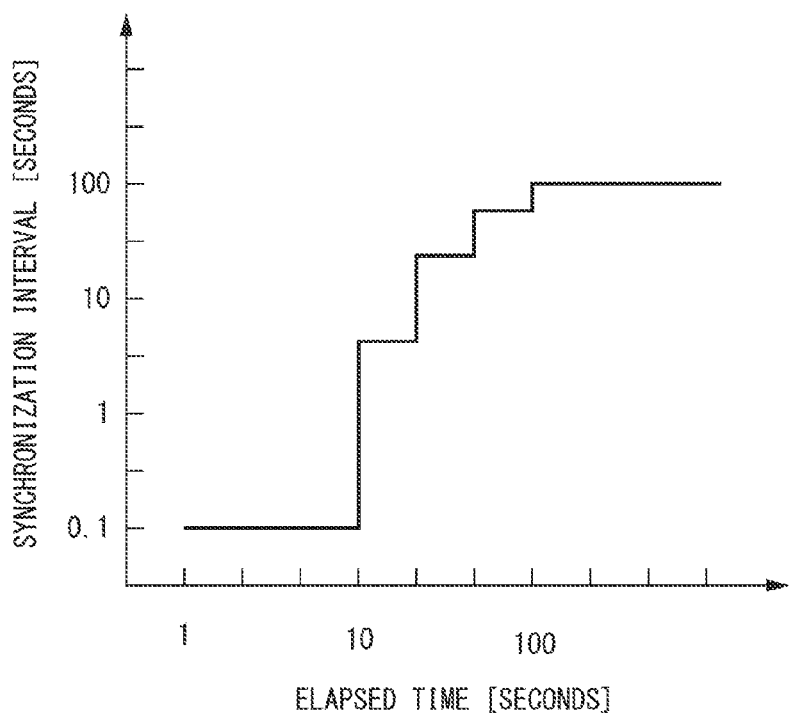
FIG. 5B is a graph illustrating a concrete example of a process of deciding the length of a synchronization interval through the synchronization interval control unit.

FIGS. 5A and 5B are graphs illustrating a concrete example of a process of deciding the length of the synchronization interval through the synchronization interval control unit 203. In FIGS. 5A and 5B, a vertical axis is an axis representing the length of the synchronization interval in units of seconds, and a horizontal axis is an axis representing the continuous synchronization frequency (the interval control value). For example, in the example of FIG. 5A, the synchronization interval is set to 0.1 seconds when the continuous synchronization frequency is in a range of 0 to 9, but when the continuous synchronization frequency is larger than 9, the synchronization interval increases at constant intervals each time the continuous synchronization frequency increases. When the continuous synchronization frequency is 100 or more, the synchronization interval becomes constant, that is, 100 seconds. In both cases of FIGS. 5A and 5B, the form of the graph is merely an example, and the graph may have a straight line form, a step-like form, or a curved line form. Further, the intervals of the value of each axis may be set to increase stepwise as illustrated in FIG. 5B or may be set to an equal interval.

Figure 6:
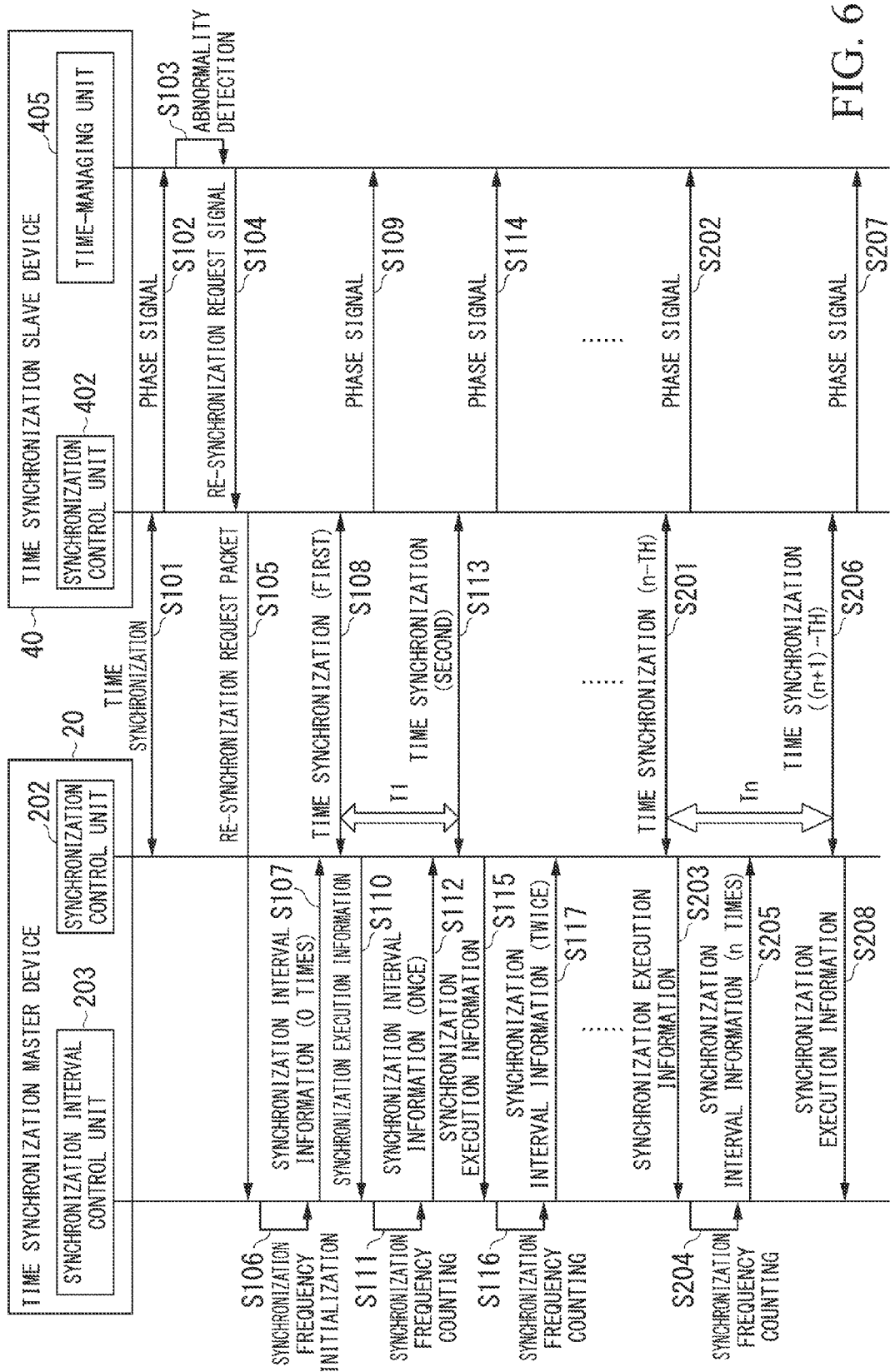
FIG. 6 is a sequence diagram illustrating the flow of an operation of the synchronizing system according to the first embodiment.

Next, the flow of an operation of the synchronizing system 100 according to the first embodiment will be described. FIG. 6 is a sequence diagram illustrating the flow of an operation of the synchronizing system 100 according to the first embodiment. The synchronization control unit 202 performs the synchronization process with the time synchronization slave device 40 at the synchronization intervals determined by the synchronization interval control unit 203 (step S101). The synchronization process starts when the synchronization control unit 202 transmits the synchronous packet to the time synchronization slave device 40. The synchronization control unit 402 of the time synchronization slave device 40 outputs the phase signal representing the difference between the slave device time and the master device time to the time-managing unit 405 as a result of time synchronization (step S102). The time-managing unit 405 corrects the slave device time based on the phase signal. At this time, the time-managing unit 405 determines whether or not the time difference represented by the phase signal is larger than the phase difference threshold value. When it is determined that the time difference represented by the phase signal is not larger than the phase difference threshold value, the time-managing unit 405 does not output the re-synchronization request signal. However, when it is determined that the time difference represented by the phase signal is larger than the phase difference threshold value, the time-managing unit 405 determines that it is an abnormal status (step S103). In this case, the time-managing unit 405 outputs the re-synchronization request signal to the synchronization control unit 402 (step S104). Upon receiving the re-synchronization request signal, the synchronization control unit 402 generates the re-synchronization request packet, and transmits the re-synchronization request packet to the time synchronization master device 20 (step S105).

Upon receiving the re-synchronization request packet, the synchronization interval control unit 203 of the time synchronization master device 20 initializes the interval control value and sets the interval control value to 0 (zero) (step S106). The synchronization interval control unit 203 transmits synchronization interval information representing the length of the synchronization interval according to the interval control value "0" to the synchronization control unit 202 with reference to the synchronization interval table (step S107). The length of the synchronization interval according to the interval control value "0" is the shortest length of the synchronization interval.

The synchronization control unit 202 performs first time synchronization based on the received synchronization interval information (step S108). The synchronization control unit 402 of the time synchronization slave device 40 generates the phase signal based on the synchronization process, and transmits the phase signal to the time-managing unit 405 (step S109). When the first time synchronization is performed, the synchronization control unit 202 of the time synchronization master device 20 transmits the synchronization execution information to the synchronization interval control unit 203 (step S110). Upon receiving the synchronization execution information, the synchronization interval control unit 203 increases the interval control value by one (1) (step S111), and transmits the synchronization interval information representing the synchronization interval according to the increased interval control value (once) to the synchronization control unit 202 (step S112).

The synchronization control unit 202 performs second time synchronization based on the received synchronization interval information (step S113). At this time, the synchronization interval, that is, a time T1 until the second time synchronization is performed after the first time synchronization, is a time interval represented by the synchronization interval information transmitted in the process of step S112. The synchronization control unit 402 of the time synchronization slave device 40 generates the phase signal based on the synchronization process, and transmits the phase signal to the time-managing unit 405 (step S114). When the second time synchronization is performed, the synchronization control unit 202 of the time synchronization master device 20 transmits the synchronization execution information to the synchronization interval control unit 203 (step S115). Upon receiving the synchronization execution information, the synchronization interval control unit 203 increases the interval control value by one (1) (step S116), and transmits the synchronization interval information representing the synchronization interval according to the increased interval control value (twice) to the synchronization control unit 202 (step S117).

The synchronization control unit 202 of the time synchronization master device 20 performs n-th (n is an integer of 1 or more) time synchronization (step S201), and the synchronization control unit 402 of the time synchronization slave device 40 transmits the phase signal to the time-managing unit 405 (step S202). Further, the synchronization control unit 202 transmits the synchronization execution information to the synchronization interval control unit 203 (step S203). Upon receiving the synchronization execution information, the synchronization interval control unit 203 increases the interval control value by one (1) (step S204), and transmits the synchronization interval information representing the synchronization interval according to the increased interval control value (n times) to the synchronization control unit 202 (step S205). Thereafter, the synchronization control unit 202 performs (n+1)-th time synchronization (step S206). At this time, the synchronization interval, that is, a time Tn until the (n+1)-th time synchronization is performed after the n-th time synchronization is the time interval represented by the synchronization interval information transmitted in the process of step S205. The synchronization control unit 402 of the time synchronization slave device 40 generates the phase signal based on the synchronization process, and transmits the phase signal to the time-managing unit 405 (step S207). When the (n+1)-th time synchronization is performed, the synchronization control unit 202 of the time synchronization master device 20 outputs the synchronization execution information to the synchronization interval control unit 203 (step S208). Thereafter, the process of steps S201 to S208 is repeatedly executed until the time-managing unit 405 determines that it is an abnormal status. When the abnormal status is determined, step S104 and the subsequent process are executed.

In the synchronizing system 100, as the length of time during which the re-synchronization request packet is not received increases, the time synchronization is performed at long synchronization intervals. Thus, as the length of time during which the re-synchronization request packet is not received increases, that is, as the length of time during which an abnormality related to synchronization of time does not occur increases, the data amount of the synchronous packet flowing through the communication path per unit time is reduced. However, when an abnormality related to synchronization of time occurs, the synchronization interval is set to a small value. Thus, when an abnormality occurs, the time synchronization is performed at short synchronization intervals, and thus a decrease in the accuracy of time synchronization is suppressed. As described above, in the synchronizing system 100, it is possible to reduce the communication frequency of the synchronous packet while suppressing a decrease in the accuracy of time synchronization performed between the time synchronization master device 20 and the time synchronization slave device 40.

When there is an abnormality in the clock signal extracted from the communication path, the abnormality is detected by the first clock signal-extracting unit 403, and the time synchronization according to the re-synchronization request packet is performed. Thus, a deviation of the time synchronization in the time synchronization slave device 40 can be reduced and suppressed.

The second clock signal used for the time-managing unit 405 to count the slave device time is synchronized with the clock signal (the first clock signal) extracted from the communication path. Thus, by using the high-accuracy clock signal as the clock signal flowing through the communication path, the slave device time can be counted based on the high-accuracy clock signal even when a high-accuracy clock signal generator is not disposed in each time synchronization slave device 40. Thus, in order to maintain the high-accuracy time synchronization, transmission and reception intervals of the synchronous packet need not be reduced.

The clock signal flowing through the communication path is synchronized with the clock signal input to the time synchronization master device 20. Thus, when the time synchronization is performed once by transmission and reception of the synchronous packet, as long as a deviation does not occur in the clock signal flowing through the communication path, a synchronous status can be obtained between the time synchronization master device 20 and the time synchronization slave device 40 without newly performing transmission and reception of the synchronous packet.

<Modified Example>

The interval control value is not limited to the above-described example. For example, the synchronization interval control unit 203 may count the length of time during which the re-synchronization request packet is not received from the time synchronization slave device 40, and the length of counted time may be used as the interval control value.

Further, the process when the re-synchronization request packet is performed is not limited to the above-described example. For example, upon receiving the re-synchronization request packet, the synchronization interval control unit 203 may determine a value of m1/m2 (m1 and m2 are integers of 1 or more, and m1<m2) of the interval control value at that point in time as the interval control value. For example, upon receiving the re-synchronization request packet, the synchronization interval control unit 203 may reduce the interval control value such that the length of the synchronization interval is reduced by m3 (m3 is an integer of 1 or more) steps in the synchronization interval table.

Upon receiving the synchronization interval information according to the interval control value of zero times, the synchronization control unit 202 may immediately perform the time synchronization regardless of the length of the synchronization interval. Through this configuration, time correction can be performed by immediately performing the time synchronization on the time synchronization slave device 40 in which an abnormality related to synchronization has occurred, and thus the abnormality can be resolved.

Further, in this configuration, the synchronization interval information (the synchronization interval information transmitted in step S107 of FIG. 6) according to the interval control value of zero times may represent the time (T1) from the first time synchronization to the second time synchronization. In this case, the process of step S112 of FIG. 6 is unnecessary.

The clock signal flowing through the communication path need not be limited to the clock signal serving as the synchronous signal used for transmission and reception of the relay device 30. For example, even when the relay device 30 is not the clock synchronization type communication device, it is desirable to provide a configuration in which the clock signal flows through the communication path. Thus, in this case, the relay device 30 need not necessarily be the clock synchronization type communication device.

In the time synchronization slave device 40, the function of outputting the re-synchronization request signal may be given to either the first clock signal-extracting unit 403 or the time-managing unit 405.

Figure 7:
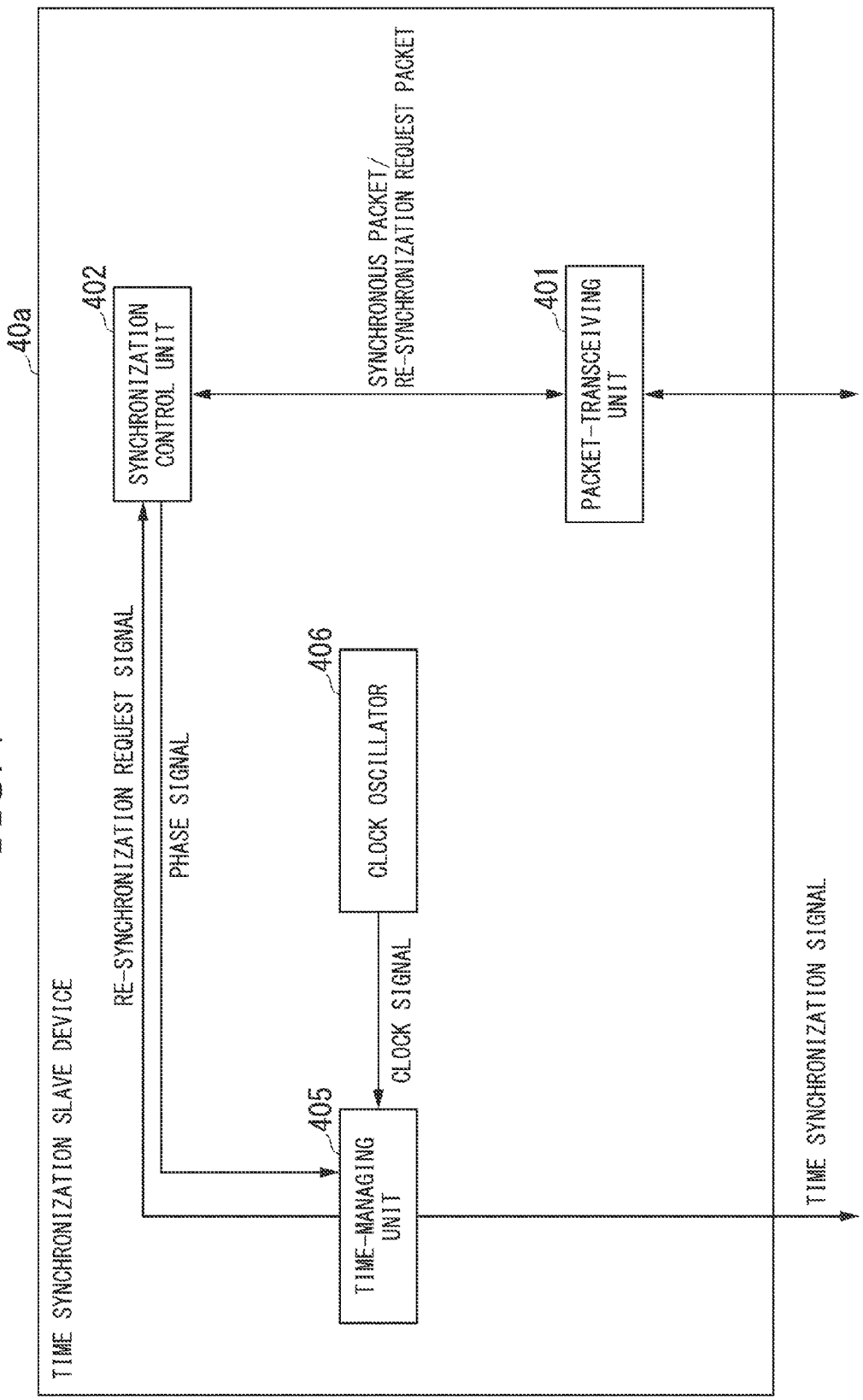
FIG. 7 is a functional block diagram illustrating a configuration of a time synchronization slave device configured to include a clock oscillator.

The time synchronization slave device 40 may be configured not to extract the clock signal from the communication path but to include a clock signal generator (a clock oscillator) in its own device. FIG. 7 is a functional block diagram illustrating a configuration of a time synchronization slave device 40a configured to include a clock oscillator 406. The time synchronization slave device 40a includes the clock oscillator 406 instead of the first clock signal-extracting unit 403 and the second clock signal-generating unit 404. The time synchronization-managing unit 405 counts a time based on the clock signal output from the clock oscillator 406. The remaining configuration of the time synchronization slave device 40a is the same as that of the time synchronization slave device 40.

The synchronization control unit 402 may detect an abnormality related to synchronization of time. Specifically, the synchronization control unit 402 may acquire the difference between the slave device time and the master device time by execution of the synchronization process, and determine whether or not the difference is larger than the phase difference threshold value. In this case, the time-managing unit 405 may be configured not to detect an abnormality related to synchronization of time.

[Second Embodiment]

Figure 8:
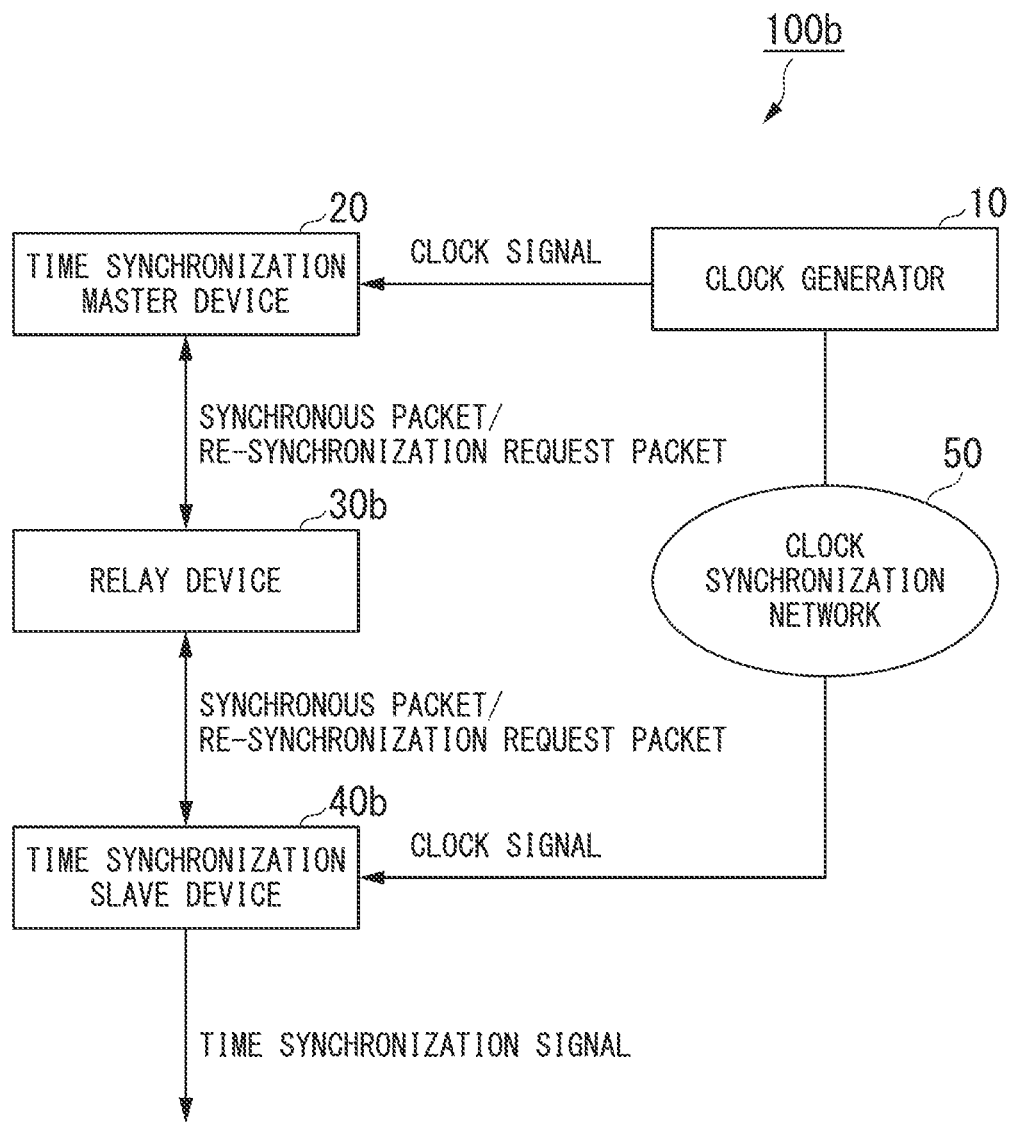
FIG. 8 is a system configuration diagram illustrating a system configuration of a synchronizing system according to a second embodiment.

FIG. 8 is a system configuration diagram illustrating a system configuration of a synchronizing system (a synchronizing system 100b) according to a second embodiment. The synchronizing system 100b differs from the synchronizing system 100 according to the first embodiment in that the clock signal used by the time synchronization slave device 40b is extracted not from the communication path between the relay device 30 and the time synchronization slave device 40b but from a clock synchronization network 50 connected with the clock generator 10. The synchronizing system 100b according to the second embodiment will be described below in detail.

The clock generator 10 is connected to the clock synchronization network 50, and supplies the clock synchronization network 50 with the clock signal.

The relay device 30b is a typical packet-transmitting device, and relays the synchronous packet without performing clock synchronization.

FIG. 9 is a functional block diagram representing a configuration of the time synchronization slave device 40b according to the second embodiment. The time synchronization slave device 40b differs from the time synchronization slave device 40 according to the first embodiment in that a first clock signal-extracting unit 403b is provided instead of the first clock signal-extracting unit 403. The remaining configuration of the time synchronization slave device 40b is the same as that of the time synchronization slave device 40 according to the first embodiment.

The first clock signal-extracting unit 403b extracts the first clock signal based on the signal received from the clock synchronization network 50 rather than the communication path through which the synchronous packet is transmitted and received.

In the second embodiment, the first clock signal used to generate the second clock signal is extracted from the clock synchronization network 50 rather than the communication path through which the synchronous packet is transmitted and received. Thus, even when a failure occurs in the communication path through which the synchronous packet is transmitted and received, a time is counted based on the first clock signal extracted from the clock synchronization network 50, and thus considerable deviation of the time (the slave device time) of the time synchronization slave device 40 is avoided.

<Modified Example>

In the synchronizing system 100b according to the second embodiment, the clock synchronization network 50 may be configured with a clock synchronization type transmission network that operates in synchronization with the clock generator 10.

The relay device 30b according to the second embodiment may perform clock synchronization and then relay the synchronous packet.

The embodiments of the invention have been described above with reference to the accompanying drawings, but the concrete configuration is not limited to the above embodiments and may include a design of a range not departing from the gist of the invention.

Priority is claimed on Japanese Patent Application No. 2011-046156, filed Mar. 3, 2011, the contents of which are incorporated herein by reference.

INDUSTRIAL APPLICABILITY

The present invention can be applied to a device that performs time synchronization between devices performing communication with each other.

REFERENCE SYMBOLS

100, 100b: synchronizing system
10: clock generator
20: time synchronization master device (second synchronizing device)
30, 30b: relay device
40, 40a, 40b: time synchronization slave device (first synchronizing device)
201: packet-transceiving unit (transceiving unit)
202: synchronization control unit
203: synchronization interval control unit
401: packet-transceiving unit (transceiving unit)
402: synchronization control unit (abnormality notification unit)
403, 403b: first clock signal-extracting unit (abnormality notification unit)
404: second clock signal-generating unit
405: time-managing unit (time-managing unit, abnormality notification unit)

The invention claimed is:

1. A synchronizing system including a first synchronizing device and a second synchronizing device that transmit or receive a synchronous packet according to a synchronous protocol, perform a synchronization process, and synchronize a time with each other, the system comprising:
  a clock generator which generates a clock signal,
  the first synchronizing device including
  a transceiving circuit structured to transmit or receive the synchronous packet to or from the second synchronizing device,
  a synchronization control circuit structured to acquire a difference between a time of the first synchronizing device and a time of the second synchronizing device based on the synchronous packet,
  a time-managing circuit structured to count the time of the first synchronizing device in synchronization with the clock signal and correct the time of the first synchronizing device to be equal to the time of the second synchronizing device based on the difference, and
  an abnormality notification circuit structured to notify the second synchronizing device of an abnormality when a status in which the clock signal extracted from a signal of a physical layer received from the communication path between the clock generator and the first synchronizing device has deteriorated is detected,
  the second synchronizing device including
  a transceiving circuit structured to transmit or receive the synchronous packet to or from the first synchronizing device,
  a synchronization interval control circuit structured to increase an interval at which the synchronization process is performed as the length of time increases, during which the second synchronizing device is not notified of the abnormality,
  a synchronization control circuit structured to perform the synchronization process at the interval determined by the synchronization interval control circuit, and
  the second synchronizing device operating in synchronization with the clock signal.

2. The synchronizing system according to claim 1, wherein, when the abnormality is notified of, the synchronization interval control circuit causes a synchronization interval until a next synchronization process to be smaller than a synchronization interval at that point in time.

3. The synchronizing system according to claim 1, wherein, when the abnormality is notified of, the synchronization control circuit immediately performs the synchronization process regardless of the interval determined by the synchronization interval control circuit.

4. A synchronizing method performed by a synchronizing system including a first synchronizing device and a second synchronizing device that transmit or receive a synchronous packet according to a synchronous protocol, perform a synchronization process, and synchronize a time with each other, the method comprising:
  a generating step of generating a clock signal by a clock generator;
  a transceiving step of transmitting or receiving, by the first synchronizing device, the synchronous packet to or from the second synchronizing device;
  a synchronization control step of acquiring, by the first synchronizing device, a difference between a time of the first synchronizing device and a time of the second synchronizing device based on the synchronous packet;

a time-managing step of counting, by the first synchronizing device, the time of the first synchronizing device in synchronization with the clock signal, and correcting, by the first synchronizing device, the time of the first synchronizing device to be equal to the time of the second synchronizing device based on the difference;

an abnormality notification step of notifying, by the first synchronizing device, the second synchronizing device of an abnormality when a status in which the clock signal extracted from a signal of a physical layer received from the communication path between the clock generator and the first synchronizing device has deteriorated is detected;

a transceiving step of transmitting or receiving, by the second synchronizing device which operates in synchronization with the clock signal, the synchronous packet to or from the first synchronizing device;

a synchronization interval control step of increasing, by the second synchronizing device which operates in synchronization with the clock signal, an interval at which the synchronization process is performed as the length of time increases, during which the second synchronizing device is not notified of the abnormality; and a synchronization control step of performing, by the second synchronizing device which operates in synchronization with the clock signal, the synchronization process at the interval determined by the synchronization interval control step.

5. A first synchronizing device of a synchronizing system including a clock generator, the first synchronizing device and a second synchronizing device, wherein the clock generator generates a clock signal, the first and second synchronizing devices transmit or receive a synchronous packet according to a synchronous protocol, perform a synchronization process, and synchronize a time with each other, and the second synchronizing device operates in synchronization with the clock signal, the first synchronizing device comprising:

a transceiving circuit structured to transmit or receive the synchronous packet to or from the second synchronizing device that increases an interval at which the synchronization process is performed as the length of time during which abnormality is not notified of increases;

a synchronization control circuit structured to acquire a difference between a time of the first synchronizing device and a time of the second synchronizing device based on the synchronous packet;

a time-managing circuit structured to count the time of the first synchronizing device in synchronization with the clock signal and correct the time of the first synchronizing device to be equal to the time of the second synchronizing device based on the difference; and an abnormality notification circuit structured to notify the second synchronizing device of an abnormality when a status in which the clock signal extracted from a signal of a physical layer received from the communication path between the clock generator and the first synchronizing device has deteriorated is detected.

6. A second synchronizing device of a synchronizing system including a clock generator, a first synchronizing device and the second synchronizing device, wherein the clock generator generates a clock signal, and the first and second synchronizing devices transmit or receive a synchronous packet according to a synchronous protocol, perform a synchronization process, and synchronize a time with each other, the second synchronizing device comprising:

a transceiving circuit structured to transmit or receive the synchronous packet to or from the first synchronizing device that notifies the second synchronizing device of an abnormality when a status in which the clock signal extracted from a signal of a physical layer received from the communication path between the clock generator and the first synchronizing device has deteriorated is detected;

a synchronization interval control circuit structured to increase an interval at which the synchronization process is performed as the length of time increases, during which the second synchronizing device is not notified of the abnormality from the first synchronizing device;

a synchronization control circuit structured to perform the synchronization process at the interval determined by the synchronization interval control circuit; and the second synchronizing device operating in synchronization with the clock signal.

7. A non-transitory computer-readable recording medium in which a computer program is recorded, the computer program causes a computer to function as a first synchronizing device of a synchronizing system including a clock generator, the first synchronizing device and a second synchronizing device, wherein the clock generator generates a clock signal, the first and second synchronizing devices transmit or receive a synchronous packet according to a synchronous protocol, perform a synchronization process, and synchronize a time with each other, and the second synchronizing device operates in synchronization with the clock signal, the computer program causing the computer to execute:

a transceiving step of transmitting or receiving the synchronous packet to or from the second synchronizing device that increases an interval at which the synchronization process is performed as the length of time increases, during which the second synchronizing device is not notified of an abnormality;

a synchronization control step of acquiring a difference between a time of the first synchronizing device and a time of the second synchronizing device based on the synchronous packet;

a time-managing step of counting the time of the first synchronizing device in synchronization with the clock signal and correcting the time of the first synchronizing device to be equal to the time of the second synchronizing device based on the difference; and an abnormality notification step of notifying the second synchronizing device of an abnormality when a status in which the clock signal extracted from a signal of a physical layer received from the communication path between the clock generator and the first synchronizing device has deteriorated is detected.

8. A non-transitory computer-readable recording medium in which a computer program is recorded, the computer program causes a computer to function as a second synchronizing device of a synchronizing system including a clock generator, a first synchronizing device and the second synchronizing device, wherein the clock generator generates a clock signal, and the first and second synchronizing devices transmit or receive a synchronous packet according to a synchronous protocol, perform a synchronization process, and synchronize a time with each other, the computer program causing the computer to execute:

a transceiving step of transmitting or receiving, in synchronization with the clock signal, the synchronous packet to or from the first synchronizing device that notifies of an abnormality when a status in which the clock signal extracted from a signal of a physical layer received from the communication path between the clock generator and the first synchronizing device has deteriorated is detected;

a synchronization interval control step of increasing, in synchronization with the clock signal, an interval at which the synchronization process is performed as the length of time increases, during which the first synchronizing device does not notify of an abnormality; and a synchronization control step of performing, in synchronization with the clock signal, the synchronization process at the interval determined by the synchronization interval control step.

* * * * *